(12) United States Patent
Venot et al.

(10) Patent No.: US 12,093,944 B2
(45) Date of Patent: Sep. 17, 2024

(54) METHODS AND SYSTEMS FOR PROVISIONING CONSUMER PAYMENT CREDENTIALS TO TOKEN REQUESTORS

(71) Applicant: Mastercard International Incorporated, Purchase, NY (US)

(72) Inventors: Claire Venot, Rambouillet (FR); Skyler Fox, Park Ridge, NJ (US); Andres Mauricio Santamaria, New York, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 933 days.

(21) Appl. No.: 17/072,540

(22) Filed: Oct. 16, 2020

(65) Prior Publication Data

US 2021/0117965 A1 Apr. 22, 2021

Related U.S. Application Data

(60) Provisional application No. 62/916,991, filed on Oct. 18, 2019.

(51) Int. Cl.
*G06Q 20/38* (2012.01)
*G06Q 20/22* (2012.01)
(Continued)

(52) U.S. Cl.
CPC ......... *G06Q 20/385* (2013.01); *G06Q 20/227* (2013.01); *G06Q 20/34* (2013.01); *G06Q 20/36* (2013.01)

(58) Field of Classification Search
CPC .... G06Q 20/385; G06Q 20/227; G06Q 20/34; G06Q 20/36
(Continued)

(56) References Cited

U.S. PATENT DOCUMENTS 9,721,268 B2 8/2017 Bondesen et al.
2013/0036048 A1* 2/2013 Campos ................ G06Q 20/40
705/41

(Continued)

FOREIGN PATENT DOCUMENTS

KR 101706894 A1 2/2017

OTHER PUBLICATIONS

"PCT International Search Report and Written Opinion" mailed Feb. 3, 2021, International Searching Authority Korean Intellectual Property Office, for Application No. PCT/US2020/055878, 8 pp.

*Primary Examiner* — Zeshan Qayyum
*Assistant Examiner* — Cristina Owen Sherr
(74) *Attorney, Agent, or Firm* — Buckley, Maschoff & Talwalkar LLC

(57) ABSTRACT

Methods and systems for facilitating provisioning of consumer payment credentials to token requestors such as a digital wallet account or a merchant account are described. In an embodiment, a mobile device processor of a consumer mobile device running a token requestor application receives an indication of a selection by a consumer of an option to add a payment card to a merchant account, displays a list of issuer applications installed on the consumer mobile device that support pull provisioning on a display screen, and receives a selection of an issuer application and issuer application login information. The process also includes determining, by the mobile device processor, that the login information is correct, displaying a list of payment cards associated with the selected issuer application, receiving a selection of a payment card from the list of payment cards, and transmitting, while running the token requestor application, a push card message including payment card account credentials of the selected payment card to an issuer financial institution (FI) computer.

11 Claims, 5 Drawing Sheets

(51) Int. Cl.
*G06Q 20/34* (2012.01)
*G06Q 20/36* (2012.01)

(58) Field of Classification Search
USPC .......................................................... 705/65
See application file for complete search history.

(56) References Cited

U.S. PATENT DOCUMENTS

| | | | |
|---|---|---|---|
| 2013/0212666 A1* | 8/2013 | Mattsson | G06Q 20/385 |
| | | | 726/9 |
| 2013/0304642 A1* | 11/2013 | Campos | G06Q 20/3572 |
| | | | 705/41 |
| 2014/0046848 A1 | 2/2014 | Radu et al. | |
| 2015/0032627 A1* | 1/2015 | Dill | G06Q 20/40 |
| | | | 705/44 |
| 2015/0100488 A1* | 4/2015 | Dua | G06Q 20/325 |
| | | | 705/41 |
| 2017/0109745 A1* | 4/2017 | Al-Bedaiwi | H04L 67/53 |
| 2019/0279196 A1 | 9/2019 | Pendse et al. | |

\* cited by examiner

METHODS AND SYSTEMS FOR PROVISIONING CONSUMER PAYMENT CREDENTIALS TO TOKEN REQUESTORS

CROSS REFERENCE TO RELATED APPLICATION

This application claims the benefit of U.S. Provisional Patent Application No. 62/916,991 filed on Oct. 18, 2019, the contents of which provisional application are hereby incorporated by reference for all purposes.

FIELD OF THE INVENTION

Methods and systems for facilitating provisioning of consumer payment credentials to token requestors (for example, a digital wallet account or a merchant account). More specifically, in disclosed embodiments a consumer using a mobile device selects an option presented by a merchant application to automatically add a payment card account to his merchant account. The consumer is then presented with a list of supported banking applications of issuer banks on a display screen, selects a banking application and an eligible payment card account, and then is returned to the merchant application which now includes the selected payment card account for use by the consumer to complete purchase transactions.

BACKGROUND

Payment articles have typically been provided in the form of plastic cards, known as payment cards (for example, credit cards and debit cards). Such payment cards contain user or consumer information which is stored on a magnetic stripe or stored on an electronic chip. Chip cards, or smart cards, or integrated-circuit (IC) cards typically include a microprocessor and a storage device that may be powered during use, for example, by a merchant's reader device. Payment cards also typically include printed information such as the payment card account holder's name, the name of the issuer financial institution (FI) or issuer bank, the name of the payment network (for example, Mastercard™ or Visa™), the user's primary account number (PAN) (which typically follows a standardized format), an expiration date, and a CVC number. Digitally stored payment card account information must be sufficient to allow the cardholder to utilize the payment card in an appropriate payment protocol, which typically conforms to an "EMV payment protocol," following EMV standards for contact or contactless transactions as found at https://www.emvco.com/document-search/.

Consumers or cardholders frequently install a mobile banking application supplied by their issuer bank on their mobile devices, which allows them to manage their bank accounts and/or payment card accounts on-the-go. Consumers can also download and use applications from digital or electronic wallets, and/or from merchants. In order to facilitate and secure payments, digital wallets and merchants (also known as "Token Requestors") request payment tokens associated with the consumers' payment cards to a Token Service Provider (TSP) and store the payment tokens. Payment tokens are used to prevent the unauthorized access to a cardholder's primary account number (PAN) during a payment process. Thus, tokens have been defined as "surrogate/alternate values that replace PANs" in part of a payment system.

In order to request a payment token from a Token Service Provider (TSP), a Token Requestor application (a digital wallet application or merchant application) typically requires a consumer to enter payment card account details (such as the consumer's PAN, an expiration date, and a CVC number) manually into specified fields of a digital wallet interface and/or a merchant interface appearing on a display screen of the consumers' mobile device. Manual entry of such information by the consumer can be tedious, is prone to errors due to mistyping some or all of the consumer's data, typically requires the consumer or cardholder to have the physical payment card handy (credit card or debit card, for example) for reference, and can result in a bad user experience (or bad cardholder experience).

Thus, the inventors recognized that it would be desirable to provide a method and system that mitigates or overcomes the above-mentioned problems.

BRIEF DESCRIPTION OF THE DRAWINGS

Features and advantages of some embodiments of the present disclosure, and the manner in which the same are accomplished, will become more readily apparent upon consideration of the following detailed description taken in conjunction with the accompanying drawings, which illustrate preferred and example embodiments and which are not necessarily drawn to scale, wherein.

DETAILED DESCRIPTION

Figure 1:
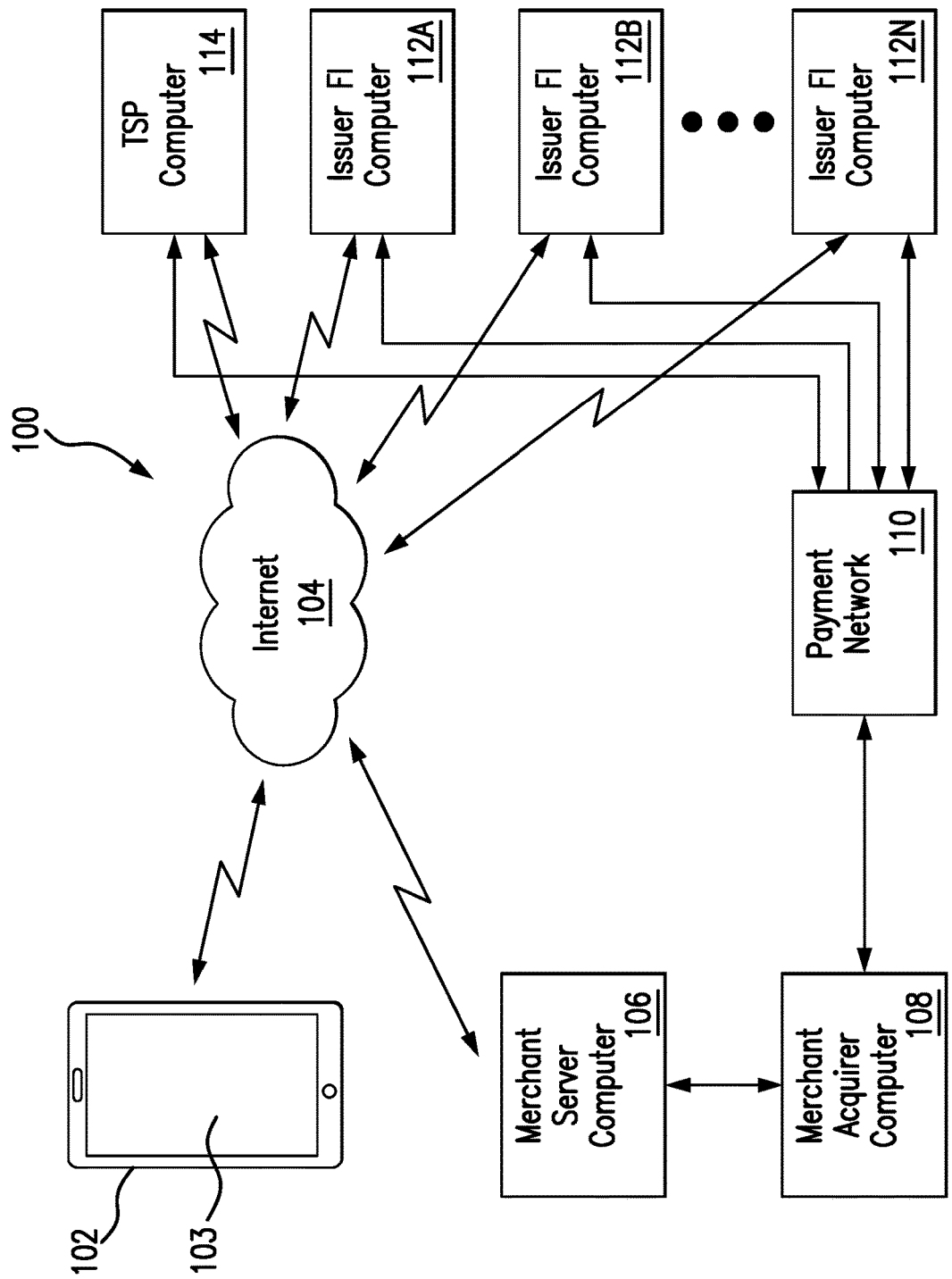
FIG. 1 is a block diagram of a system for automatically provisioning consumer payment card credentials to a merchant account in accordance with embodiments of the present disclosure.

Reference will now be made in detail to various novel embodiments, examples of which are illustrated in the accompanying drawings. The drawings and descriptions thereof are not intended to limit the invention to any particular embodiment(s). On the contrary, the descriptions provided herein are intended to cover alternatives, modifications, and equivalents thereof. In the following description, numerous specific details are set forth in order to provide a thorough understanding of the various embodiments, but some or all of the embodiments may be practiced without some or all of the specific details. In other instances, well-known process operations have not been described in detail in order not to unnecessarily obscure novel aspects.

A number of terms will be used herein. The use of such terms is not intended to be limiting, but rather the terms are used for convenience and ease of exposition. For example, as used herein, the term "user" may be used interchangeably with the term "consumer" and/or with the term "cardholder," and these terms are used herein to refer to a person, individual, consumer, business or other organization that owns (or is authorized to use) a financial account. A financial account may include a payment card account (for example, a credit card account or a debit card account) or some other type of account (such as a loyalty card account). The term "payment card account" may include a credit card account, a debit card account, a loyalty card account and/or a deposit account or other type of financial account that an accountholder or cardholder may access. The term "payment card account number" includes a number that identifies a payment card system account or a number carried by a payment card, and/or a number that is used to route a transaction in a payment system that handles credit card and/or debit card transactions and the like. Moreover, as used herein the terms "payment card system" and/or "payment network" refer to a system and/or to a network for processing and/or handling purchase transactions and/or related transactions, which may be operated by a payment card system operator such as MasterCard International Incorporated, or a similar system. In addition, in some implementations payment card system may be limited to systems in which member financial institutions (such as banks) issue payment card accounts to individuals, businesses and/or other entities or organizations (and thus are known as issuer financial institutions (FIs) or issuer banks).

In general, and for the purposes of introducing concepts of embodiments of the present disclosure, disclosed herein are methods and systems that facilitate provisioning consumer payment card credentials to a token requestor customer account (for example, a digital wallet account or a merchant account of the consumer). In some embodiments, a consumer utilizes his or her mobile device to select an option offered by a merchant application (for example, the option may appear in a merchant user interface presented to the cardholder on a mobile device display screen) to add a payment card account to his merchant account. When the cardholder selects the option, the merchant application running on the consumer's mobile device invokes an application-to-application process which displays a list of banking applications available on the cardholder's mobile device and supporting the selected option. The selected banking application launches and receives merchant metadata (such as merchant identifier, name, logo, and the like) supplied by the merchant application. The consumer is then presented with a login screen for the selected banking application, logs in, and is presented with a display of at least one eligible payment card account for adding to the consumer's merchant account. After the consumer selects a payment card account to add, the consumer is returned to the merchant application. In addition, the banking application (of the issuer bank) transmits the reference of the consumer's payment card account credentials to the merchant application. In some implementations, the merchant communicates with a Token Service Provider to tokenize the consumer's payment card account credentials, and then adds the consumer's tokenized payment card account credentials to the merchant account associated with the consumer.

FIG. 1 is a block diagram of a system 100 for provisioning consumer payment card credentials to a token requestor account (e.g., a merchant account or a wallet account) in accordance with embodiments of the present disclosure. The system 100 includes a user mobile device 102 utilized by a consumer or cardholder and configured for communicating with a merchant server computer 106 via the Internet 104. Also included in the system 100 are a merchant acquirer computer 108 operably connected to a payment network 110. The payment network 110 is also operably connected to a plurality of different issuer financial institution (FI) computers 112A, 112B to 112N and operably connected to a Token Service Provider (TSP) computer 114. The TSP computer 114 may also communicate with the issuer FI computers 112A, 112B to 112N via the Internet 104, and may also be configured for communications with other components, such as the merchant server computer 106 via the Internet 104. It should be understood that other types and/or different networks could be utilized in addition to, or instead of, the Internet 104 as the means of communication between the various components of the system 100.

During a typical purchase transaction which includes use of a merchant-generated token, the payment network 110 receives purchase transaction data from the merchant acquirer computer 108 that is associated with a purchase being made by the cardholder using the mobile device 102 from a merchant mobile application or from a merchant website hosted by the merchant server computer 106. The payment network 110 uses the payment token in the purchase transaction data to contact the TSP computer 114 to recover the payment card account associated with the token and to identify the cardholder's issuer FI. The payment network 110 further requests purchase transaction authorization from the identified issuer FI, and then proceeds to accept or deny the purchase transaction. In an example of the functionality described herein, the TSP computer 114 communicates with an identified issuer FI and a merchant to seamlessly tokenize a cardholder's selected payment card account and provision it to a merchant account of the cardholder for use in future purchase transactions.

In embodiments disclosed herein, issuer financial institutions (FIs) desiring to permit cardholders to utilize a cardholder pull-provisioning service to facilitate the provisioning of their payment card accounts to their wallet or merchant accounts must register with the TSP. In addition, when registering with the TSP an issuer FI must agree or contract to accept all token requestors (wallets and merchants) who are on-boarded for the token pull-provisioning service. Moreover, all token requestors who wish to offer the token pull-provisioning service to consumers must register with the TSP and must agree to accept the payment card accounts issued by all of the registered issuer FIs.

Referring to FIG. 1, each block that represents an entity and/or computer should also be understood to represent one or more computers operated by or on behalf of that entity. In addition, the system 100 illustrated in FIG. 1 is presented in the context of illustrating provisioning of one consumer's payment card credentials to a merchant account using the cardholder provisioning service disclosed herein. However, a practical embodiment of the system 100 may be configured for handling a plurality of provisioning requests from a plurality of cardholders, including numerous simultaneous provisioning requests from a plurality of users or cardholders utilizing a plurality of different types of user devices 102 and involving many different token requestors (merchants or wallets), for example. Therefore, the system 100 may include additional entities and/or computers and/or computer networks and/or computing resources that also perform at least some of the roles performed by the entities, devices, components and/or computers shown explicitly in FIG. 1.

Referring again to FIG. 1, a cardholder may utilize a browser or a merchant application running on the user device 102 (such as a smartphone, tablet computer, personal digital assistant (PDA), and the like) to access a merchant website (hosted by the merchant computer 106) via the Internet 104 to shop. In some embodiments, the merchant application running on the consumer's mobile device 102 may include an option to "Add a Payment Card From My Bank App" which may be displayed on a display component at checkout (but this option may be presented at another time or location while the merchant application is running). This option may be presented as a radio button or other type of selection icon, for example, for selection via a touchscreen 103 by the consumer. In some embodiments, this selection by the consumer initiates a pull-provisioning process that provisions and tokenizes the credentials of the consumer's selected payment card to her merchant account. Using the "Add a Payment Card From My Bank App" option facilitates adding a payment card account, for example, to the consumer's merchant account by automatically providing, for example, payment card information to the merchant account without requiring the consumer to manually enter payment card details or payment card account credentials into a menu or into a merchant's user interface.

Figure 2:
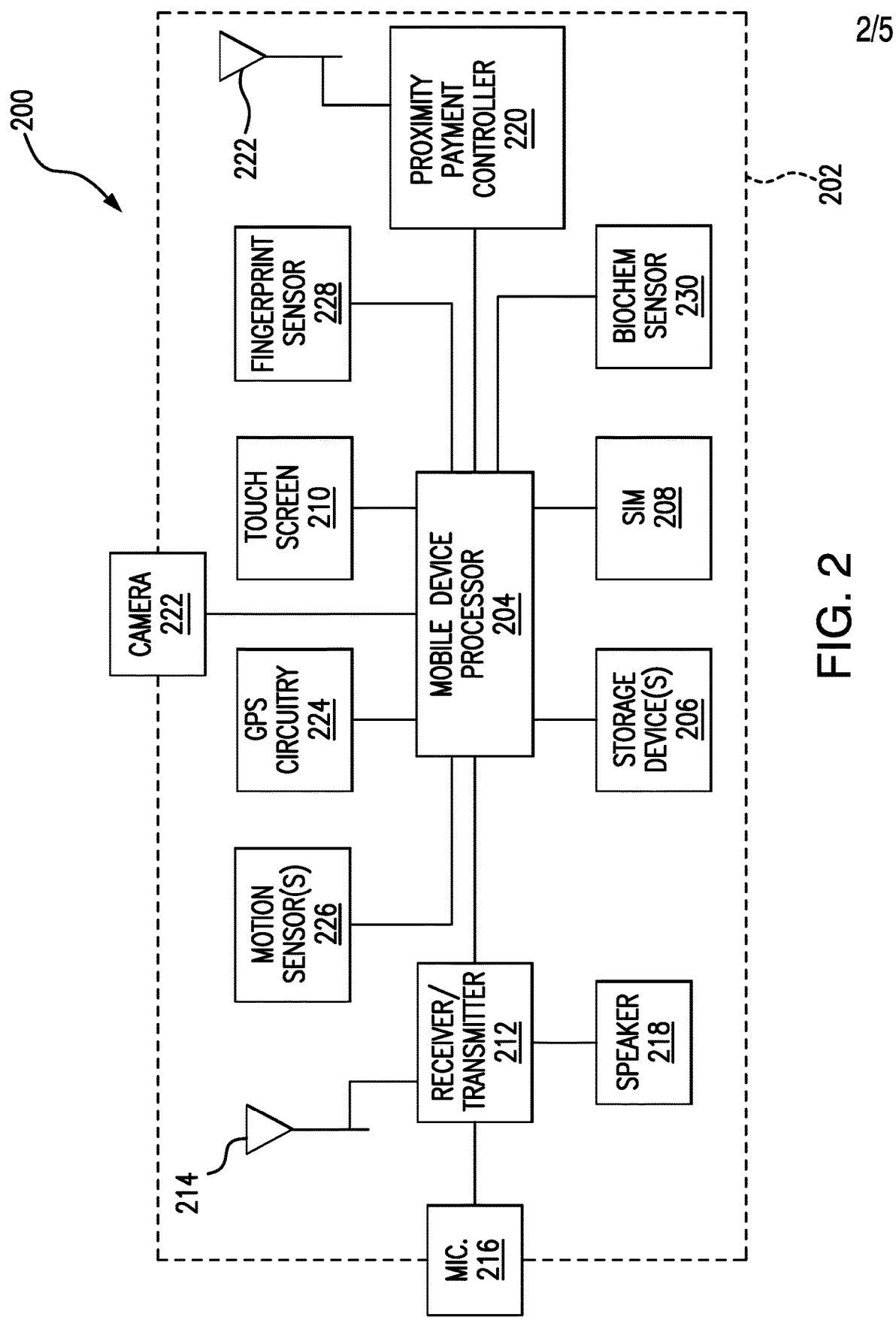
FIG. 2 is a block diagram of an embodiment of a user mobile device in accordance with some embodiments of the disclosure.

FIG. 2 is a block diagram of an embodiment of a user or consumer mobile device 200 illustrating hardware aspects in accordance with some embodiments described herein. In this example, the user mobile device 200 is a mobile telephone or smartphone that is capable of wireless communications. However, other types of mobile devices such as feature phones, tablet computers, personal digital assistants (PDAs), digital music players, other types of digital wearable devices and other handheld and/or portable electronic devices, may include similar components and could be capable of wireless communications and be configured for functioning to add a consumer's or cardholder's payment card account to a merchant account or a wallet in accordance with processes disclosed herein.

In the example shown in FIG. 2, the consumer mobile device 200 is a payment-enabled mobile telephone capable of online purchase transactions and includes hardware that is configured to provide the novel functionality described herein. In some other embodiments, however, functionality as described herein may result at least partially from novel software and/or middleware and/or firmware components that program or instruct one or more mobile device processors of the consumer mobile device 200.

Referring to FIG. 2, the consumer mobile device 200 may include a conventional housing (indicated by dashed line 202) that contains and/or supports the components of a mobile telephone. The consumer mobile device 200 includes a mobile device processor 204 for controlling over-all operation, for example, it may be suitably programmed to allow the consumer mobile device to engage in data communications and/or text messaging with other wireless devices and/or electronic devices, and to allow for interaction with mobile device applications and/or web pages accessed via browser software over the Internet. Other components of the consumer mobile device 200, which are in communication with and/or are controlled by the mobile device processor 204, include one or more storage devices 206 (for example, program memory devices and/or working memory and/or secure storage devices, and the like), a subscriber identification module (SIM) card 208, and a touch screen display 210 for displaying information and/or for receiving user input.

The consumer mobile device 200 also includes receive/transmit circuitry 212 that is also in communication with and/or controlled by the mobile device processor 204. The receive/transmit circuitry 212 is operably coupled to an antenna 214 and provides the communication channel(s) by which the consumer mobile device 200 communicates, for example, via a mobile network (not shown). The consumer mobile device 200 further includes a microphone 216 operably coupled to the receive/transmit circuitry 212 and operable to receive voice input from the user. In addition, a loudspeaker 218 is also operably coupled to the receive/transmit circuitry 212 and provides sound output to the user.

In some embodiments, the consumer mobile device 200 includes a proximity payment controller 220 which may be a specially designed integrated circuit (IC) or chipset. The proximity payment controller 220 may be a specially designed microprocessor that is operably connected to an antenna 222 and may function to interact with a Radio Frequency Identification (RFID) and/or Near Field Communication (NFC) proximity reader (not shown), which may be associated, for example, with a contactless Point-of-Sale (POS) terminal of a merchant. For example, the proximity payment controller 220 may provide information and/or data, such as a user's payment card account number stored in a wallet application, when the user is using the consumer mobile device 200 to conduct a purchase transaction to pay for merchandise, for example, by communicating with a POS terminal of a merchant in a retail store location.

The consumer's mobile device 200 may include one or more sensors and/or circuitry that functions to provide and/or obtain user identification data and/or user authentication data from a user or consumer or cardholder. For example, the consumer mobile device 200 may be a Smartphone including one or more components and/or authenticators such as an integrated camera 222, a microphone 216, global positioning sensor (GPS) circuitry 224, one or more motion sensors 226, a fingerprint sensor 228 and/or a biochemical sensor 230 that are operably connected to the mobile device processor 204. One or more additional types of biometric components (not shown), such as heart rate sensors and/or heart rate monitors, blood pressure sensors, iris and/or retina detectors, oxygen sensors, glucose and/or blood sugar sensors, pedometers and/or speed sensors, body temperature sensors, and the like, could also be utilized to provide biometric data for use to authenticate the user or cardholder. In addition, the microphone 216 may be utilized by a consumer to provide, for example, voice print data for authentication purposes.

Referring again to FIG. 2, the GPS circuitry 224 may be operable to generate information concerning the location of the user and/or user consumer mobile device 200. In addition, the motion sensor(s) 226 may be operable to generate motion data, for example, that may be transmitted to the authentication service computer 104 for processing during a transaction and used to authenticate a user. For example, data may be generated that can be used to identify the user's walking style or gait. In another example, the motion sensor(s) 226 may operate to generate force data associated with, for example, the force generated by the user's finger when he or she touches the touch screen 210.

Also shown in FIG. 2 is a fingerprint sensor 228 which may include a touch pad or other component (not shown) for use by the user to touch or swipe his or her index finger when fingerprint data is required to identify the user in order to conduct a transaction (such as provide entry to a building). The biochemical sensor 230 may include one or more components and/or sensors operable to obtain user biological data, such as breath data and/or saliva from the user for analysis.

In some implementations, more than one form of consumer identification data and/or user biometric data may be required to authenticate a user or consumer and/or to provide additional services. For example, if a consumer is attempting to utilize the consumer mobile device 200 to add a payment card to a merchant application or merchant website then several different types of user biometric data may be required by the authentication service computer in accordance with one or more issuer financial institution business rules. In such cases, several different types of biometric data of the consumer may be required, for example, fingerprint data, photographic data representing the consumer's or user's face to permit facial recognition processing, global positioning service (GPS) data (location data), to securely authenticate the consumer or user.

Figure 3:
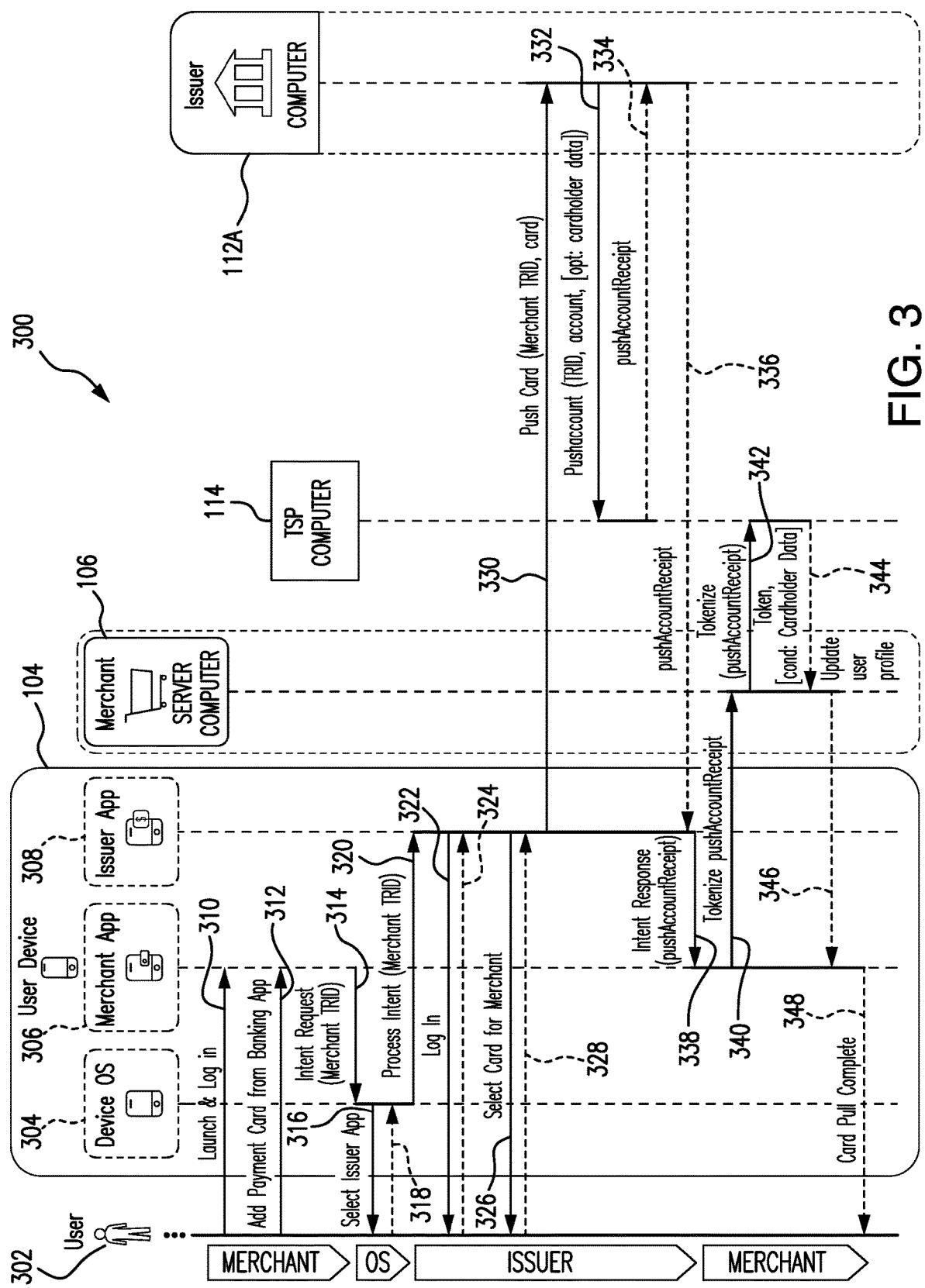
FIG. 3 is a flow diagram of a pull-provisioning process for provisioning consumer payment account credentials to an external entity, such as a merchant account, in accordance with embodiments of the disclosure.

FIG. 3 is a flow diagram of a provisioning process 300 in accordance with the disclosure. Specifically, the provisioning process 300 is utilized to provision consumer payment credentials to an external entity account, such as a merchant account, in accordance with embodiments disclosed herein. The process illustrated by FIG. 3 includes communications between a consumer mobile device 104, a merchant website computer 106, a Token Service Provider (TSP) computer 114 (which may be the Mastercard Digital Enablement Services (MDES) owned and operated by Mastercard International Incorporated), and an issuer financial institution (FI) computer 112A. In embodiments disclosed herein, a user or cardholder 302 has a mobile device 104 loaded with a mobile device operating system (OS) 304, a wallet application or merchant application 306 (which when launched presents a user interface (UX), not shown, on a display screen), and at least one issuer FI application 308.

In some embodiments, the process 300 leverages on infrastructure (operations and technology) already provided by a payment services company, such as Mastercard International Incorporated, which also supports push-provisioning services (for example, the "MDES Token Connect" service). In addition, the pull-provisioning process disclosed herein advantageously leverages application-to-application (app-to-app) communication mechanisms that are available on various types of mobile device operating systems (OS) which are specifically designed to run on consumer mobile devices such as mobile phones, smartphones, personal digital assistants (PDAs), tablet computers and other handheld devices. Although the functionality and/or instructions may vary slightly for each type of mobile device OS, it is contemplated that processor executable instructions in the form of mobile device applications can be created for various different types of operating systems, such as the Android™ operating system (created by Google™), the iOS operating system (created by Apple™), and other mobile device operating systems, which instructions when executed by a mobile device processor operate in the manner described herein to provision a cardholder's payment card credentials to a merchant account.

Referring again to FIG. 3, in an embodiment a consumer or cardholder 302 uses her mobile device 104 to login to a merchant application 306, which may be accomplished by the cardholder entering or providing a login password and/or biometric data, or which may be accomplished with stored credentials (for example, a digital cookie). In some embodiments, the cardholder 302 may decide to choose to "Add a payment card" to his or her merchant account at checkout. However, it should be understood that adding a payment card account in accordance with processes described herein can occur at any other time (which may depend upon the merchant and/or how the opportunity to add a payment card account to merchant's system is presented via the merchant application to the cardholder).

For example, the consumer 302 launches 310 a merchant application 306 and logs-in to her merchant account. In an implementation, the consumer 302 is then presented with an option on a display screen or touchscreen (not shown; but see touchscreen 210 of FIG. 2) to select 312 an "Add Payment Card from Banking App" radio button or other selection icon (not shown) associated with that choice (as mentioned above, this may occur when the cardholder or consumer is about to checkout from the merchant's retail website by paying for, for example, chosen items and/or services). The consumer's selection initiates a pull-provisioning process that tokenizes and provisions a payment card selected by the consumer 302 to her merchant account without the consumer having to manually enter payment card details or payment card credentials into a merchant's user interface.

Referring again to FIG. 3, after selection of the "Add Payment Card from Banking App" icon by the consumer or user 302, the merchant app 306 invokes 314 an application-to-application (app-to-app) communication mechanism (an Intent Request) from the mobile device OS 304 that includes a Merchant Token Requestor Identifier (TRID) as a parameter. In some implementations, a "Select Bank App" pop-up box (not shown) next appears 316 on the touchscreen of the consumer mobile device that includes a list of installed banking applications (issuer FI apps). The displayed list of issuer FI apps support the pull-provisioning process (which means these are banking applications of issuer FIs that have registered with the TSP computer 114 for the pull-provisioning payment card service, and such issuer FI applications would be configured and/or designed to accept and process incoming requests from merchant applications). The consumer then selects 318 a particular banking app, and next a message (which may be an "Intent" message) along with the merchant TRID and other metadata is transmitted 320 to the selected issuer FI app 308 (or banking app 308).

Referring again to FIG. 3, the issuer app or banking app 308 receives the message and the information supplied by the merchant app 306, which includes the merchant TRID, and launches. The consumer is then presented 322 with the banking app login page (not shown) on the touchscreen and logs in 324 by providing a user identifier such as a password and/or biometric data (which may depend upon the banking app capabilities and/or available authentication components of the consumer's mobile device 104). Once logged in, the consumer is driven directly to a payment card selection interface screen (not shown) where the consumer or user must select a payment card (or payment card account) that he or she wants the merchant server computer 106 to store in a merchant account that is associated with the consumer 302. In some implementations, the payment card selection interface screen displays the merchant name and/or logo (which may be based on the merchant metadata supplied as parameter), along with a display of one or more payment card accounts for selection. The consumer then selects a payment card from the list, which selection is transmitted 328 to the banking app 308. The banking app 308 then forwards 330 the selection (including the merchant TRID) to the issuer FI computer 112A.

Next, in some embodiments, the issuer FI computer 112A transmits 332 the selected payment card credentials to the Token Services Provider (TSP) computer 114 using a "Push-Account" instruction (for example, when the MDES operated by Mastercard International Incorporated is utilized), and the TSP computer 114 provides 334 a "pushAccountReceipt" message in response. Next, in some implementations, the issuer FI computer 112A transmits 336 the "pushAccountReceipt" to the banking app 308 running on the consumer's mobile device 104 which transmits 338 an "Intent Response" (containing the pushAccountReceipt) to the merchant app 306. The merchant app 306 then transmits 340 a tokenize pushAccountReceipt message to the merchant server computer 106, which then transmits 342 a tokenization request for the pushAccountReceipt to the TSP computer 114.

The TSP computer 114 next retrieves the payment card credentials from the pushAccountReceipt, tokenizes the payment card credentials and transmits 344 a token reference to the merchant server computer 106 representing the user's selected payment card account, which then updates the user profile to include the token reference representing the consumer's selected payment card. In some implementations, the merchant server computer 106 also transmits 346 a confirmation message to the merchant app 306 indicating that the consumer's profile has been successfully updated, and then a consumer payment card update success message (not shown) is displayed 348 to the consumer.

In an alternate embodiment, after the banking app 308 forwards 330 the selection of the consumer's payment card (including the merchant TRID) to the issuer FI computer 112A, the issuer FI computer 112A transmits 332 cardholder data to the TSP computer 114 with the selected payment card. The TSP computer then associates the cardholder data to the pushAccountReceipt, and transmits 344 the cardholder data to the merchant server computer 106, together with the token reference representing the user's selected payment card account. The merchant server computer 106 then updates the user profile to include the token representing the consumer's selected payment card and may update the user profile with some or all of the cardholder data received from the TSP computer 113.

Thus, systems and methods disclosed herein advantageously allow consumers or cardholders using a mobile device to select an option offered by a merchant application to add a payment card account without requiring the cardholder to manually input payment card account information and/or credentials, for example, into a menu or user interface. In addition, the disclosed provisioning process may be characterized as a "pull" provisioning process which can advantageously tokenize card credentials during a consumer purchase transaction, for example, in the initial stage of a merchant checkout process for the cardholder. The processes disclosed herein therefore solve the technological problem of how to securely, accurately and automatically provision a payment card account of a consumer to a merchant account without requiring the consumer to manually provide payment card account credentials. In an implementation, after the consumer has finished shopping on a merchant's web site and opens a checkout webpage, an option is presented to "Add Payment Card from Banking App" that, when selected causes a "Select Bank App" pop-up box to appear on the user's mobile device from which the user can launch a banking application (app) installed on the cardholder's mobile device. The user then logs in to the banking app and confirms a choice of a payment card account for use with the merchant application. After confirming a selection of a payment card account, in implementations the process advantageously includes returning the consumer to the merchant application (or target wallet) so that the cardholder can complete a purchase transaction. The disclosed processes leverage on existing TSP infrastructure and are thus seamless with regard to TSP operations for the entity providing the cardholder provisioning service.

Figure 4:
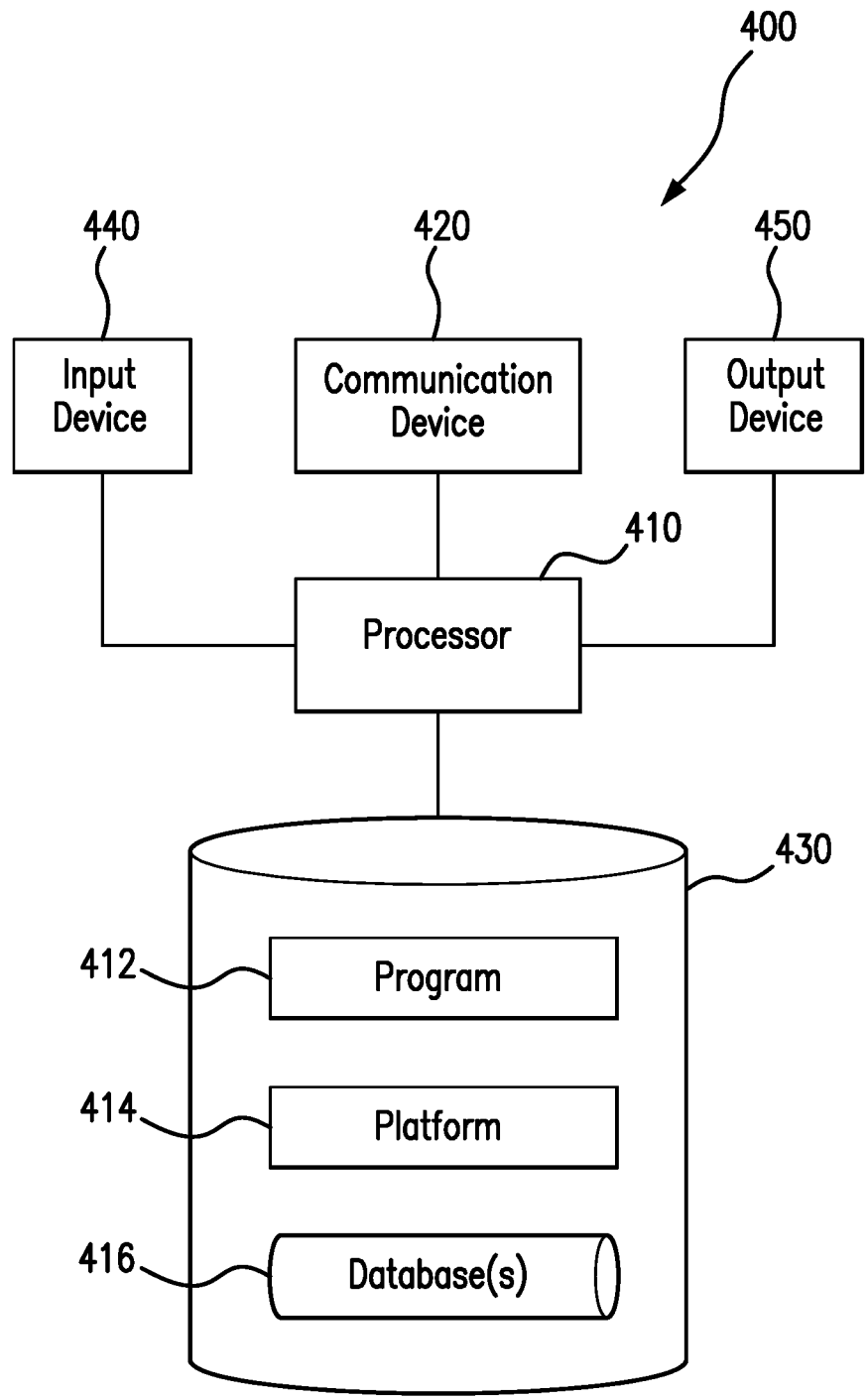
FIG. 4 is a block diagram of a computing device in accordance with embodiments of the disclosure.

FIG. 4 is a block diagram of a computer device or computer server 400 according to some embodiments. The apparatus 400 may include general-purpose and/or special-purpose computing components and may execute program code or processor executable instructions to perform any of the functions described herein. In addition, the apparatus 400 may include one or more implementations of one or more of the elements or components of the system 100 shown in FIG. 1, and the apparatus 400 may include additional elements which are not shown in accordance with some embodiments. For example, the computer device 400 may be implemented as a merchant server computer, merchant acquirer computer, payment network computer, TSP computer, Issuer financial institution computer, and/or other computers in accordance with the disclosure.

Apparatus 400 includes processor 410 operatively coupled to communication device 420, non-transitory storage device or memory 430, one or more input devices 440, and one or more output devices 450. Communication device 420 may facilitate communication with external devices, such as a consumer mobile device (not shown). Input device(s) 440 may include, for example, a keyboard, a keypad, a mouse or other pointing device, a microphone, a control knob or switch, an infra-red (IR) port, a docking station, and/or a touch screen. Input device(s) 440 may be used, for example, to manipulate graphical user interfaces and/or to input information into apparatus 400. Output device(s) 450 may include, for example, a display (for example, a display screen or a touch screen) a speaker, and/or a printer, and the like.

Storage device or memory 430 may include any storage device and/or non-transitory storage media, including combinations of magnetic storage devices (e.g., magnetic tape, hard disk drives and flash memory), optical storage devices, Read Only Memory (ROM) devices, Random Access Memory (RAM), flash memory, solid-state memory, and the like.

The storage device 430 stores a program 412 and/or platform logic 414 including processor executable instructions which may control operation of the processor 410. Thus, the processor 410 performs or executes the processor executable instructions of the programs 412, 414, and thereby operates in accordance with any of the embodiments described herein, including but not limited to the disclosed consumer payment card account provisioning processes.

The programs 412, 414 may be stored in a compressed, uncompiled and/or encrypted format. In addition, the programs 412, 414 may include other program elements, such as an operating system, a database management system, and/or device drivers that may be used by the processor 410, for example, to interface with peripheral devices. The storage device 430 may also include one or more other database(s) 416 which may store processor executable instructions which when executed cause the processor 410 to operate in a manner consistent with one or more of the processes disclosed herein, including facilitating provisioning of consumer payment card account credentials to token requestors (for example, a wallet account or a merchant account) in a manner that does not require a cardholder to manually input payment card account information and/or credentials. The one or more database(s) 416 may also have connectivity to one or more other databases (not shown) which may be required for operations in some embodiments.

Figure 5:
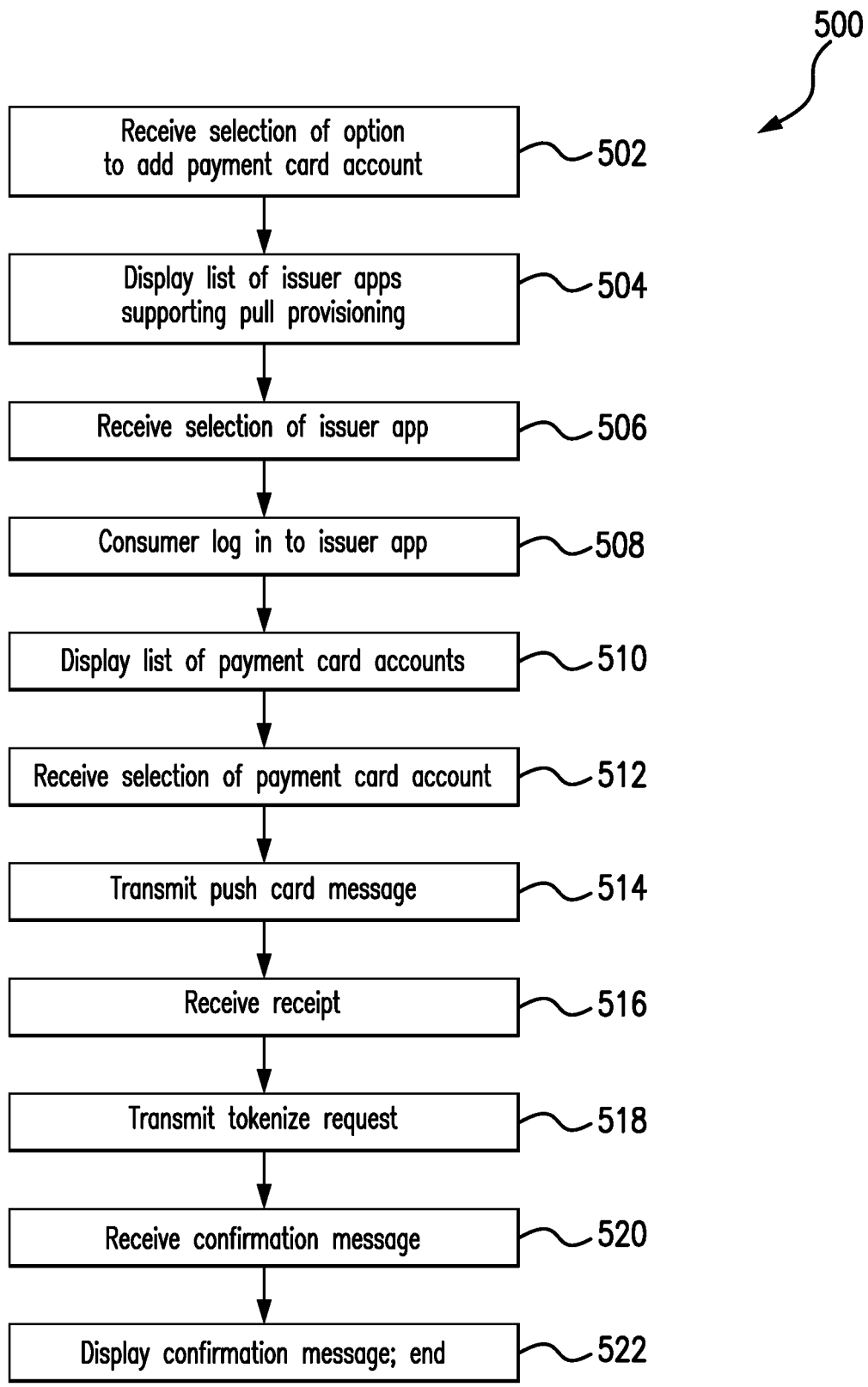
FIG. 5 is a flowchart illustrating a method for adding consumer payment card credentials to a token requestor account in accordance with embodiments of the disclosure.

FIG. 5 is a flowchart 500 illustrating a method for adding consumer payment card credentials to a merchant account in accordance with some embodiments. In this example, a mobile device processor of a consumer mobile device running a token requestor application (which in this case is a merchant application) receives 502 an indication of a selection by a consumer of an option to add a payment card account to a merchant account. For example, a consumer may select an option to "Add Card" that may be found in a merchant application running on the consumer's mobile device, which merchant application the consumer is using to shop, for example, on the merchant's retail website. When the "Add Card" option is selected by the consumer, the mobile device processor displays 504 on a display screen for review by the consumer a list of issuer applications installed on the consumer mobile device that support pull provisioning of a consumer payment card. The consumer can then decide which issuer application he or she wishes to launch. The mobile device processor next receives 506 a selection by the consumer of an issuer application. Accordingly, only those issuer applications that are registered (and thus support pull provisioning) are displayed to the consumer for selection.

Referring to FIG. 5, when the consumer successfully logs in 508 to the selected issuer application supporting pull provisioning, then the issuer application via the mobile device processor displays 510 a list of payment cards associated with the selected issuer application. (If the consumer log in is unsuccessful, in some embodiments the consumer is prompted to retry. In some implementations, after a pre-defined number of log in attempts are unsuccessful, then the process ends and a "log in failed" message may be displayed to the consumer on the display of the consumer mobile device).

As shown in FIG. 5, after successful log in to the issuer application, the mobile device processor (now running the issuer application), receives 512 a selection of a payment card by the consumer from the list of payment cards, and then transmits 514 a push card message comprising payment card credentials of the payment card selected by the consumer to an issuer financial institution (FI) computer associated with the issuer application. Next, the mobile device processor running the issuer application receives 516 a receipt from the issuer FI computer, and transmits it to the merchant (token requestor) application running on the mobile device processor. The mobile device processor running the merchant application then transmits 518 a tokenization request comprising the receipt to a merchant server computer. The mobile device processor running the merchant application next receives 520 a confirmation message from the merchant server computer indicating that the consumer's primary account number (PAN) associated with the selected payment card has been successfully tokenized. In addition, the confirmation message indicates that the token representing the PAN (the customer's payment card) has been added to the user's merchant account. Lastly, the mobile device processor displays 522 a payment card account confirmation message on the display screen which indicates that the payment card selected by the consumer has been added to the merchant account (via use of the merchant application, which in this example is the token requestor application).

The system diagrams and/or figures represent logical architectures for describing processes according to some embodiments, and actual implementations may include more, or different components arranged in other manners. Other topologies may be used in conjunction with other embodiments. Moreover, each system described herein may be implemented by any number of computing devices in communication with one another via any number of other public and/or private networks. Two or more of such computing devices of may be located remote from one another and may communicate with one another via any known manner of network(s) and/or a dedicated connection. Each computing device may comprise any number of hardware and/or software elements suitable to provide the functions described herein as well as any other functions. For example, any computing device used in an implementation of system 100 may include a processor to execute program code such that the computing device operates as described herein.

As noted above, systems and processes discussed herein may be embodied in processor executable instructions or program code stored on one or more computer-readable non-transitory storage media. Such media non-transitory media may include, for example, a fixed disk, a floppy disk, a CD-ROM, a DVD-ROM, a Flash drive, magnetic tape, and solid-state RAM or ROM storage units. Embodiments are therefore not limited to any specific combination of hardware, software or middleware. As will be appreciated based on the foregoing specification, the above-described examples of the disclosure may be implemented using computer programming or engineering techniques including computer software, firmware, middleware, hardware or any combination or subset thereof.

The computer programs (also referred to as programs, software, software applications, "apps", or code) may include machine readable instructions for a programmable processor and may be implemented in a high-level procedural and/or object-oriented programming language, and/or in assembly/machine language.

As used herein, the term "computer" should be understood to encompass a single computer or two or more computers in communication with each other.

As used herein, the term "processor" should be understood to encompass a single processor or two or more processors in communication with each other.

As used herein, the term "memory" should be understood to encompass a single memory or storage device or two or more memories or storage devices.

As used herein, a "server" includes a computer device or system that responds to numerous requests for service from other devices.

The above descriptions and illustrations of processes herein should not be considered to imply a fixed order for performing the process steps. Rather, the process steps may be performed in any order that is practicable, including simultaneous performance of at least some steps and/or omission of steps.

Although the present disclosure has been described in connection with specific example embodiments, it should be understood that various changes, substitutions, and alterations apparent to those skilled in the art can be made to the disclosed embodiments without departing from the spirit and scope of the disclosure.

What is claimed is:

1. A method for facilitating provisioning of consumer payment card credentials to an external token requestor account comprising:
   receiving, by a mobile device processor of a consumer mobile device running a token requestor application, an indication of a selection by a consumer of an option presented by a merchant application running on the consumer mobile device to add a payment card to a merchant account associated with the consumer;
   displaying, by the mobile device processor on a display screen, in response to receiving indication of a selection by a consumer of an option presented by the merchant application, a list of issuer applications installed on the consumer mobile device supporting pull provisioning of consumer payment card credentials;

receiving, by the mobile device processor, a selection of an issuer application and issuer application login information from the consumer;

transmitting, by the mobile device processor to the selected issuer application, a process intent message and a merchant token request identifier (TRID) which launches the issuer application;

displaying, after the consumer successfully logs in to the selected issuer application, by the mobile device processor on the display screen, a merchant name associated with the consumer's merchant account and a list of payment cards associated with the selected issuer application;

receiving, by the mobile device processor running the token requestor application, a selection of a payment card from the list of payment cards for storing in the consumer's merchant account, a merchant server computer; and transmitting, by the mobile device processor running the token requestor application to an issuer financial institution (FI) computer, a push card message comprising the TRID and the payment card credentials of the selected payment card.

2. The method of claim 1, further comprising:

receiving, by the mobile device processor running the issuer application, a receipt from the issuer FI computer;

transmitting, by the issuer application running on the mobile device processor, the receipt to the token requestor application;

transmitting, by the mobile device processor running the token requestor application to a token requestor server computer, a tokenization request comprising the receipt; and receiving, by the mobile device processor from the token requestor server computer, a confirmation message indicating successful tokenization.

3. The method of claim 2, further comprising displaying, by the mobile device processor on the display screen, a payment card confirmation message indicating successful addition of the selected payment card to the merchant account.

4. The method of claim 3, wherein the displayed payment card confirmation message comprises a token requestor application page including a selected payment card indication.

5. The method of claim 1, wherein the token requestor application comprises one of a digital wallet application or a merchant application.

6. The method of claim 1, wherein displaying the list of issuer applications comprises:

determining, by the mobile device processor, at least one issuer application that is registered with a token service provider (TSP); and displaying, by the mobile device processor, the at least one issuer application.

7. A consumer mobile device for facilitating provisioning of at least one consumer payment card to an external token requestor account comprising:

a mobile device processor;

a display screen operably connected to the mobile device processor; and a storage device operably connected to the mobile device processor, wherein the storage device stores a merchant application, an issuer application and processor executable instructions which when executed cause the mobile device processor to:

receive, while running the token requestor application, an indication of a selection of an option presented by the merchant application to add a payment card to a merchant account associated with a consumer;

display, in response to receiving indication of a selection by a consumer of an option presented by the merchant application, a list of issuer applications installed on the consumer mobile device supporting pull provisioning of consumer payment card credentials of the consumer on the display screen;

receive a selection of an issuer application and issuer application login information from the consumer;

transmit a process intent message and a merchant token request identifier (TRID) to the selected issuer application which launches the issuer application;

display, after the consumer successfully logs in to the selected issuer application and while running the issuer application, a merchant name associated with the consumer's merchant account and a list of payment cards associated with the selected issuer application on the display screen;

receive a selection of a payment card from the list of payment cards for storing in the consumer's merchant account at a merchant server computer; and transmit, while running the token requestor application, a push card message to an issuer financial institution (FI) computer, the push card message comprising the TRID and payment card credentials of the selected payment card.

8. The consumer mobile device of claim 7, wherein the storage device stores further processor executable instructions which when executed cause the mobile device processor to:

receive, while running the issuer application, a receipt from the issuer FI computer;

transmit, by the issuer application, the receipt to a token requestor application;

transmit, while running the token requestor application, a tokenization request comprising the receipt to a token requestor server computer; and receive, while running the token requestor application, a confirmation message from the token requestor server computer indicating successful tokenization.

9. The consumer mobile device of claim 8, wherein the storage device stores further processor executable instructions which when executed cause the mobile device processor to display a payment card confirmation message on the display screen, the payment card confirmation message indicating that the selected payment card has been added to the consumer's token requestor account.

10. The consumer mobile device of claim 9, wherein the displayed payment card confirmation message comprises a token requestor application page including a selected payment card indication.

11. The consumer mobile device of claim 7, wherein the token requestor application comprises one of a digital wallet application or a merchant application.

* * * * *